Figure 1:
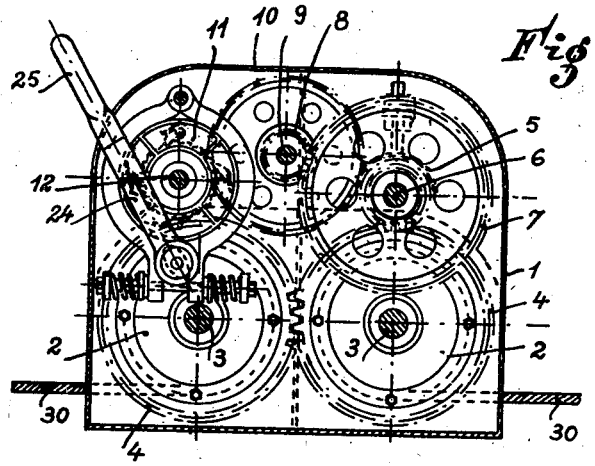

Sept. 23, 1947.  A. J. PRINCE  2,427,877
WINCH FOR LIFEBOATS
Filed July 2, 1938  3 Sheets-Sheet 1

Inventor
Alfred James Prince
By Blinger, Atty.

Sept. 23, 1947.  A. J. PRINCE  2,427,877
WINCH FOR LIFEBOATS
Filed July 2, 1938  3 Sheets-Sheet 2

Inventor:
Alfred James Prince
By
B. Singer, atty.

Sept. 23, 1947. A. J. PRINCE 2,427,877
WINCH FOR LIFEBOATS
Filed July 2, 1938 3 Sheets-Sheet 3
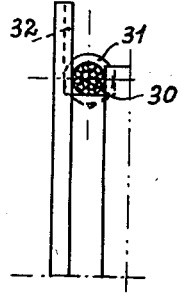
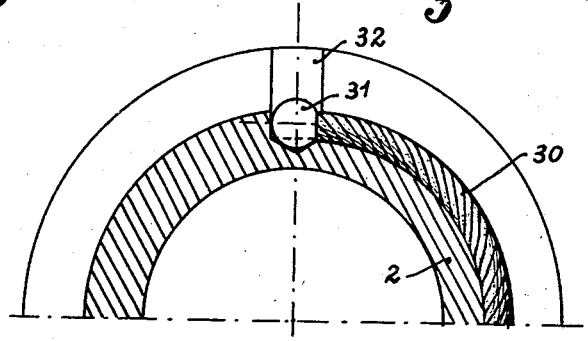
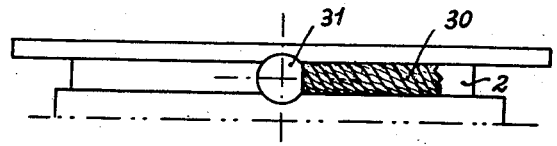
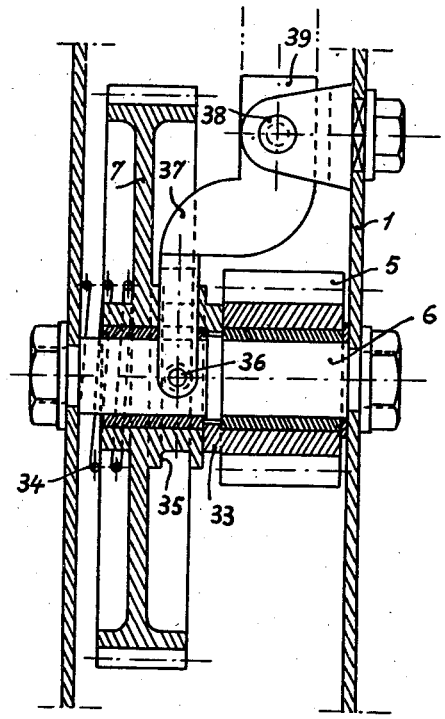
Inventor
Alfred James Prince Patented Sept. 23, 1947

2,427,877

UNITED STATES PATENT OFFICE 2,427,877

WINCH FOR LIFEBOATS

Alfred James Prince, Le Havre, France, assignor to Societe Salvare, Societe Anonyme, Le Havre, France Application July 2, 1938, Serial No. 217,235
In France July 6, 1937

Section 3, Public Law 690, August 8, 1946.
Patent expires July 6, 1957

1 Claim. (Cl. 254—184)

The present invention has for object to embody improvements in double drum winches which have to act on two cables simultaneously and at the same speed.

These winches capable of receiving many applications, are particularly serviceable for launching and raising of ships' lifeboats, operations for which there already exist numerous devices tending to replace the elementary uncertain and dangerous means of using pulley blocks for the suspension cables.

Amongst these apparatus there appear, in fact, preferable, these described in the U. S. A. Patent 1,931,432, in which the drive takes place inside the lifeboat itself and which comprises two drums with helicoidal groove, each receiving one of the suspension cables and rendered integral one with the other by gears of the same characteristic features to ensure their strictly synchronous rotation and, in consequence, the unwinding or winding up of identical lengths of both cables for the purpose of always maintaining the lifeboat practically horizontal.

The improvements foreshadowed by the invention are precisely capable, in this particular application, of ensuring a gentle and rapid lowering of the lifeboat by one man placed in the latter no matter what may be the load in the lifeboat and no matter under what conditions.

One of the features of the invention consists in ensuring two brakings of the descent of the lifeboat of which one acts so as to limit the speed of this descent to a determined value and the other ensures the constant locking of the apparatus and thereby the stopping of the said descent which can thereafter only occur by releasing this second braking means.

This feature therefore permits of preventing any unintentional descent of the lifeboat if the person attending to the apparatus lets go this control.

One feature resides also in that the braking means for limiting the speed is ensured by a centrifugal brake acting on the shaft having the greatest possible speed to reduce the dimensions and the weight of the brake blocks and thereby the weight of the whole apparatus itself.

Another feature resides in that the ratchet device necessary for the raising of the lifeboat, and the two brakes are assembled on a same spindle in the form of a compact assembly actuated by a single lever.

A feature also consists in the fact that the single operating lever is removable and serves for operating a clutch device allowing of freeing the drums for slacking the cables, this arrangement avoiding any false movement and permitting but one at the time.

Figure 2:
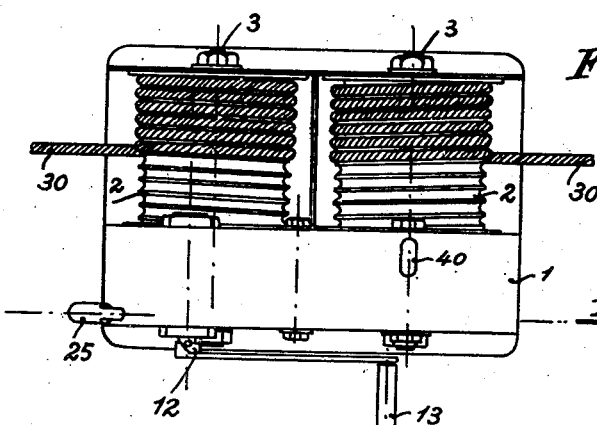
Figure 3:
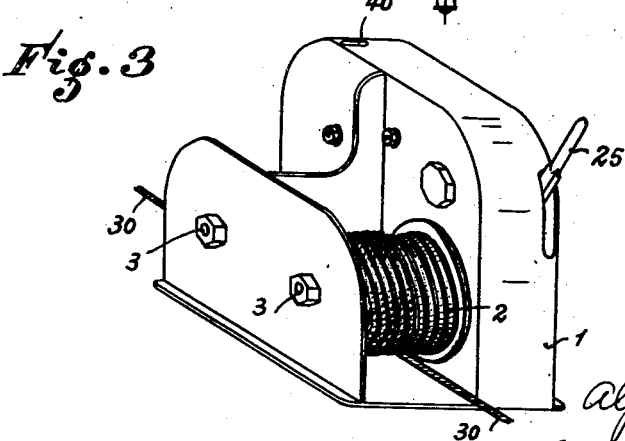
Figure 4:
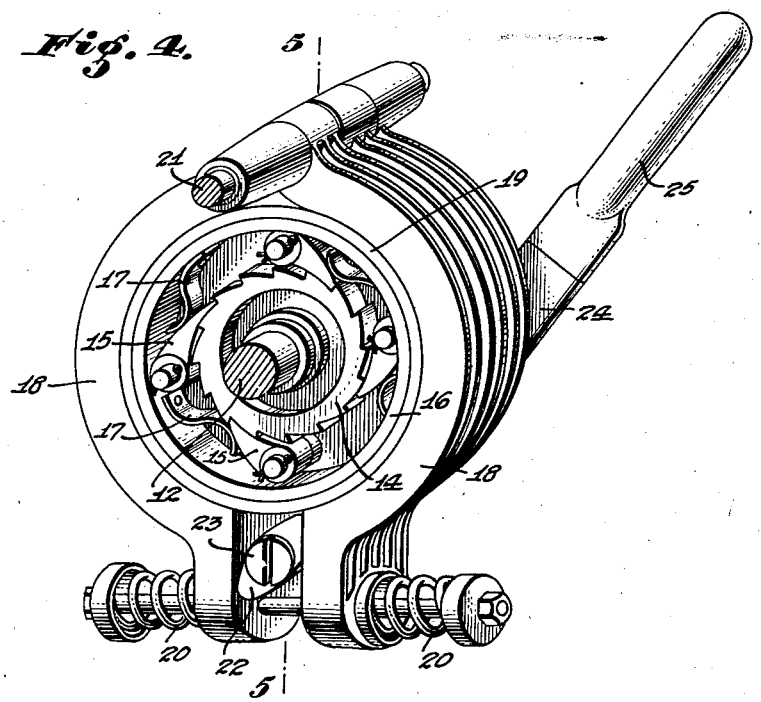
Figure 5:
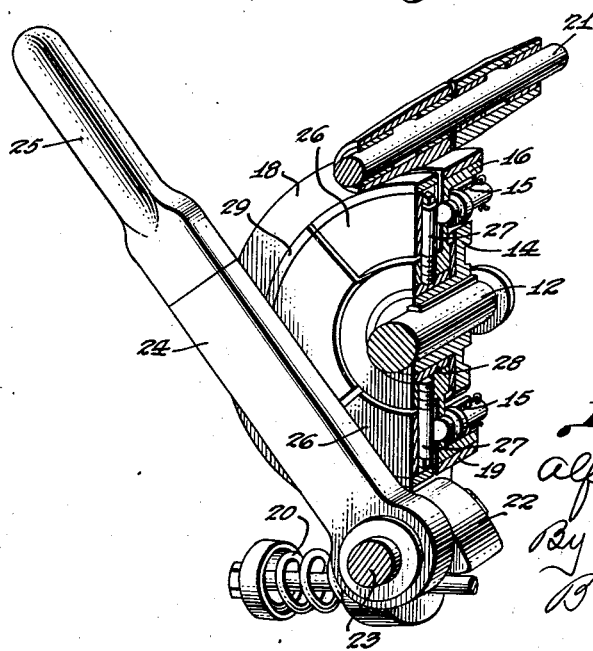

Various other features will moreover become clear during the following description and with reference to the accompanying drawing which shows:

Fig. 1 an elevation of the apparatus in section on the line I—I of Figure 2;

Fig. 2 a plan view of the apparatus;

Fig. 3 a perspective view of the whole of the apparatus allowing the release of the drums to be seen;

Fig. 4 the brake for stopping the descent, shown in perspective;

Fig. 5 the complete braking means shown in section taken on the line 5—5 of Figure 4;

Figs. 6 to 8 the method of securing the cables on the drums;

Fig. 9 the clutch means for the drums for releasing the cables.

In the form of construction of the subject of the invention given by way of simple example, the winch consists as follows:

In a frame casing I is enclosed the whole of the driving mechanism for the drums 2 which, alone, remain completely free and readily accessible (Figs. 1 to 3).

The two drums 2 rotate loose on two shafts 3 secured on the frame and are integral with two equal gears 4 constantly in mesh with each other and ensuring individual synchronous rotation of the drums.

One of these gear 4 meshes with a toothed wheel 5 mounted loose on a shaft 6 and integralised with a wheel 7 which in turn meshes with another pinion wheel 8 mounted on a shaft 9 and integral with a wheel 10.

This last mentioned wheel is in mesh with a pinion wheel 11 fast on a shaft 12.

This assembly forms a speed gear in which the shaft 12 turns at the greatest speed. It is therefore on this shaft that one can act, with the least amount of power, in order to brake or lock the winch thus composed, or again for winding up the cables on the drums and raise the lifeboat, if, for example, the winch is used for the launching and raising of a lifeboat.

The members required to effect these three operations are then assembled on this shaft 12 in a very reduced space and housed in the casing 1.

These members firstly comprise a free wheel device with pawls permitting the raising of the lifeboat by means of a crank handle 13 (Fig. 2) acting directly on the shaft 12 without affecting the braking device.

For this purpose a ratchet wheel 14 is keyed on the shaft 12 and is thus integralised with the train of gear wheels of the drums 2 (Figs. 4 and 5).

With the teeth of the ratchet wheel 14 engage pawls 15 carried by a drum 16 rotating loose on the shaft 12. Springs 17 holds the pawls always in engagement with the teeth of the ratchet wheel.

Around the drum 16 are disposed the jaws 18 of a brake acting on the periphery of the drum through the intermediary of a lining 19 and kept constantly in action by two springs 20 drawing them together. The action of this brake is fairly strong to lock the winch permanently by keeping its drum 16 stationary.

Therefore, to permit the rotation of the said winch, it is necessary to release the jaws which pivot about an axis 21. This is possible by reason of a cam 22 disposed between the extremities of the jaws and rendered integral with an axis 23 driven by a stationary lever 24 in which engages a removable lever 25 which extends it outside the casing 1.

It will now be seen that the lever allows, by its action on the brake 18, the operation of the winch which, normally remains stationary so long as no action of the lever occurs. The winch therefore ceases to act as soon as the lever is released.

Nevertheless, in order to limit the speed of descent to a determined value which could not be done with this lever without difficulty, this device is provided with a second brake.

The latter consists of weights or masses 26 disposed against the drum 16 between the jaws 18. These masses, in the form of sectors are slidingly mounted on axes 27 screwed radially in a sleeve 28 integral with the said drum. They are provided with a brake lining 29.

It will be immediately seen that the said weights or masses carried along in the same rotary movement as the shaft 12, will tend to move apart or away from the axis of said shaft and will come into contact with their lining, with the internal face of the jaws 18 thus braking the rotation of the shaft and limiting its speed in proportion to their weight.

To permit of the easy release of the cables 30 for the suspension of the lifeboat, the extremity of each of them is provided with a spherical ball 31 engaging in a groove 32 formed in each drum 2 (Figs. 6 to 8). This arrangement is extremely simple and permits of the easy hooking on of the cable even at night and no matter what may be the torsion of the cable because it is always easy to put the ball 31 in position guided by the groove 32.

Moreover, the form of the ball prevents its hooking on at the passage of the grooves of the guide means and its slight volume avoids accidents which are caused at the balancing of the cable in the case of pulley blocks.

But it is useful, at the moment where the lifeboat reaches the water, for the operator controlling the action to be able to slacken the cables at the exact moment he considers it useful. For this purpose it is necessary to be able to make the drums 2 loose and permit of the rapid unwinding or paying out of that part of the cable which has remained wound up.

For this purpose the toothed pinion wheel 5 is rendered integral with the toothed wheel 7 by means of a clutch device formed, for instance by dogs 33 (Fig. 9).

The wheel 7 is mounted so as to slide on the shaft 6 and the dogs are kept in engagement by a spring 34. The hub of the wheel 7 is provided with a groove 35 in which engage two fingers 36 carried by a fork 37 pivoting about a stationary spindle 38. This fork is provided with a socket 39 adapted to receive the removable lever 25 then passing through an aperture 40 formed in the casing 1 for this purpose (Fig. 2).

By manipulating the fork 37 the wheel 7 is moved away from the pinion wheel 5 and the dogs freely uncouple thereby the said pinion wheel and consequently the wheels 4 integral with the drums 2. As soon as the lever is released, the fork re-assumes its normal position and the spring returns the dogs into engagement.

It will thus be seen that the lever 25 serves two purposes: the operation of the brakes and the release of the drums and that in both cases, the winch is put into the stop position as soon as the lever is released. All danger of unintentional descent is therefore constantly removed.

The apparatus offers an absolute security and in addition, many advantages.

Thus the mechanism enclosed in the casing is sheltered from oxidation and prevents any danger of accident through the gears. It nevertheless is easily kept in order.

The released drums offer, on the contrary, the advantage of being able to follow the winding up of the cables and to remedy in case of need, their mixing up.

The single control of the brakes by removable lever allows the operator, by removing it, to alone assure himself of the possibility of operating the apparatus when he considers it necessary.

It is clear that the winch described hereinabove by way of simple example can receive modifications in shape and detail within the spirit of the invention.

What I claim is:

In apparatus of the class described, including a winch comprising two identical drums, over each of which a cable may be wound and gearing to secure the synchronous rotation of said drums; a braking apparatus cooperative with said gearing and comprising a driving shaft, a drum loose on said shaft, a one-way acting pawl and ratchet connection between said drum and said shaft, weighted brake shoes mounted on said drum for radial movement, brake jaws embracing both the periphery of said drum and said brake shoes, yieldable means for pressing said jaws with holding force against said periphery and in the direction of said shoes, and manually actuated means to spread said jaws to release said drum, said brake shoes when said drum is released and rotated being then applicable with braking action to the adjacent faces of said jaws, when desired.

ALFRED JAMES PRINCE.

REFERENCES CITED

The following references are of record in the file of this patent:

UNITED STATES PATENTS

| Number | Name | Date |
| --- | --- | --- |
| 1,197,394 | Philippi | Sept. 5, 1916 |
| 1,285,821 | Smith | Nov. 26, 1918 |
| 1,756,459 | Gormley | Apr. 29, 1930 |
| 1,931,432 | Petit Colos | Oct. 17, 1933 |
| 2,047,494 | Schat | July 14, 1936 |
| 2,099,676 | Coffing | Nov. 23, 1937 |

FOREIGN PATENTS

| Number | Country | Date |
| --- | --- | --- |
| 423,235 | Great Britain | Oct. 25, 1933 |